(12) United States Patent
Herpin

(10) Patent No.: US 8,579,587 B2
(45) Date of Patent: Nov. 12, 2013

(54) METHOD OF REDUCING OR EVEN ELIMINATING THE VIBRATION OF A ROTORCRAFT LIFT AND PROPULSION ROTOR, AND AN AIRFOIL ASSEMBLY AND A ROTOR IMPLEMENTING SAID METHOD

(75) Inventor: Gilles Herpin, Lan Con (FR)

(73) Assignee: Eurocopter, Marignane Cedex (FR)

( * ) Notice: Subject to any disclaimer, the term of this patent is extended or adjusted under 35 U.S.C. 154(b) by 635 days.

(21) Appl. No.: 12/839,553

(22) Filed: Jul. 20, 2010

(65) Prior Publication Data
US 2011/0027082 A1  Feb. 3, 2011

(30) Foreign Application Priority Data
Jul. 28, 2009  (FR) ...................................... 09 03706

(51) Int. Cl.
*B64C 11/28*  (2006.01)
(52) U.S. Cl.
USPC .............. 416/1; 416/87; 416/156; 244/17.27; 244/218
(58) Field of Classification Search
USPC ............................ 244/17.11, 17.27, 218, 46; 415/162–165, 194, 195; 416/61, 87, 416/155, 156, 205
See application file for complete search history.

(56) References Cited

U.S. PATENT DOCUMENTS

| | | | |
|---|---|---|---|
| 5,253,979 A * | 10/1993 | Fradenburgh et al. ..... | 416/223 R |
| 5,620,303 A | 4/1997 | Moffitt et al. | |
| 5,642,982 A * | 7/1997 | Matuska et al. ................ | 416/87 |
| 5,735,670 A * | 4/1998 | Moffitt et al. ................... | 416/87 |
| 6,030,177 A * | 2/2000 | Hager .............................. | 416/87 |
| 6,354,536 B1 * | 3/2002 | Torok et al. ..................... | 244/39 |
| 6,655,915 B2 * | 12/2003 | Gmirya .......................... | 416/88 |
| 8,152,466 B2 * | 4/2012 | Gandhi .......................... | 416/88 |
| 2003/0206802 A1 | 11/2003 | Gmirya | |
| 2006/0237581 A1 | 10/2006 | Gerbino | |

FOREIGN PATENT DOCUMENTS

| | | |
|---|---|---|
| GB | 1188946 A | 4/1970 |
| GB | 1188947 | 4/1970 |
| JP | 03007697 | 1/1989 |
| JP | 04215596 | 8/1992 |
| WO | 0212063 A1 | 2/2002 |

OTHER PUBLICATIONS

Search Report and Written Opinion; Application No. FR 09 03706; dated Apr. 6, 2010.
Popescu; "Several Considerations Regarding the Variable Blade Length Rotor"; Journal of Aircraft, vol. 31, No. 4 Jul./Aug. 1994 No. 4, Washington D.C.

* cited by examiner

*Primary Examiner* — Edward Look
*Assistant Examiner* — Woody A Lee, Jr.
(74) *Attorney, Agent, or Firm* — Brooks Kushman P.C.

(57) ABSTRACT

The present invention relates to a method of reducing the vibration of a lift and propulsion rotor (5) of a rotorcraft (1), the rotor having a plurality of airfoil assemblies (10) that perform rotary movement around a drive axis (AX) of the rotor (5), each airfoil assembly (10) comprising a blade (20) extending longitudinally from a root (22) suitable for being fastened to hinge means (4) of a hub (6) of said rotor (5) to a free end (21), a first distance (D1) extending between said free end (21) and said hinge means (4). In the method, said first distance (D1) is caused to vary cyclically so that the projection (TR) of the center of gravity (Cg) of a blade (20) on a horizontal plane (P) perpendicular to said drive axis (AX) and containing said hinge means (4) describes a circle.

21 Claims, 4 Drawing Sheets

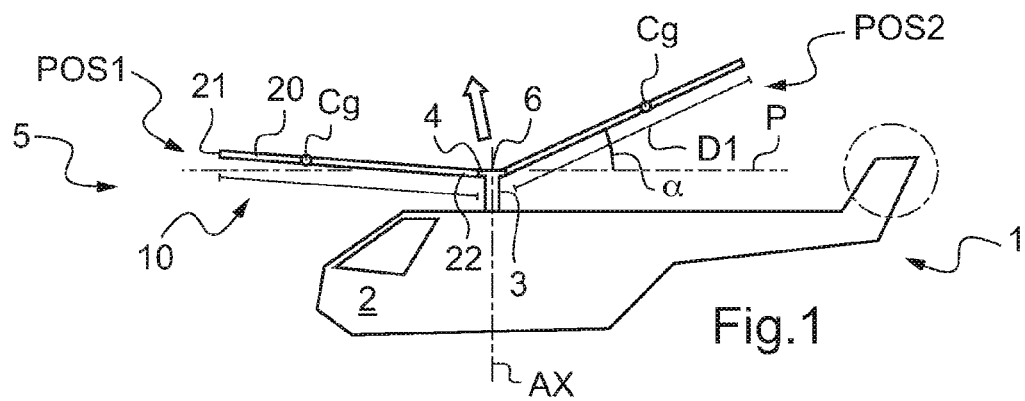
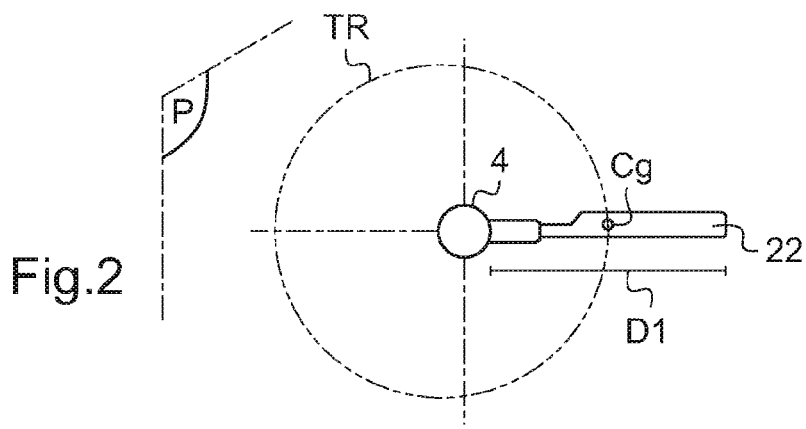
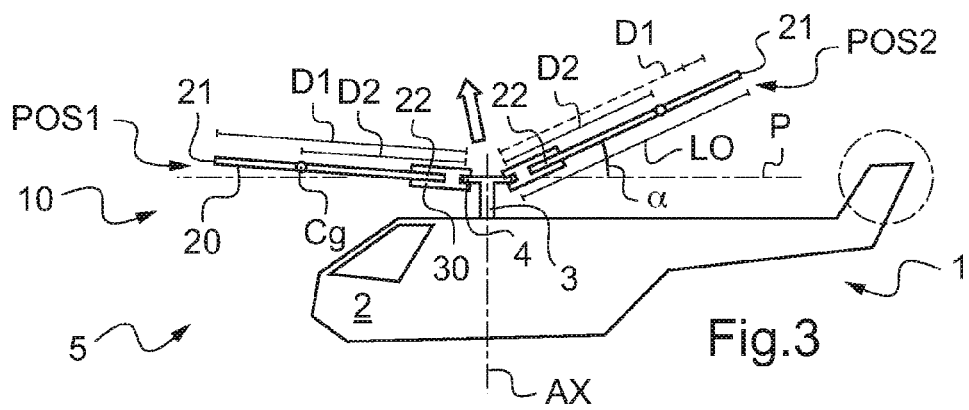
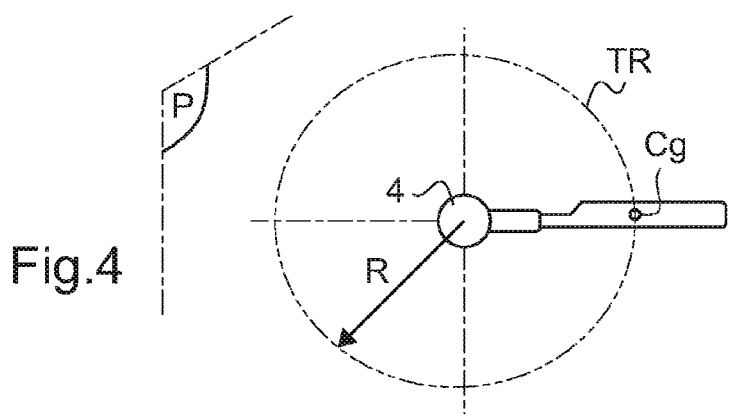

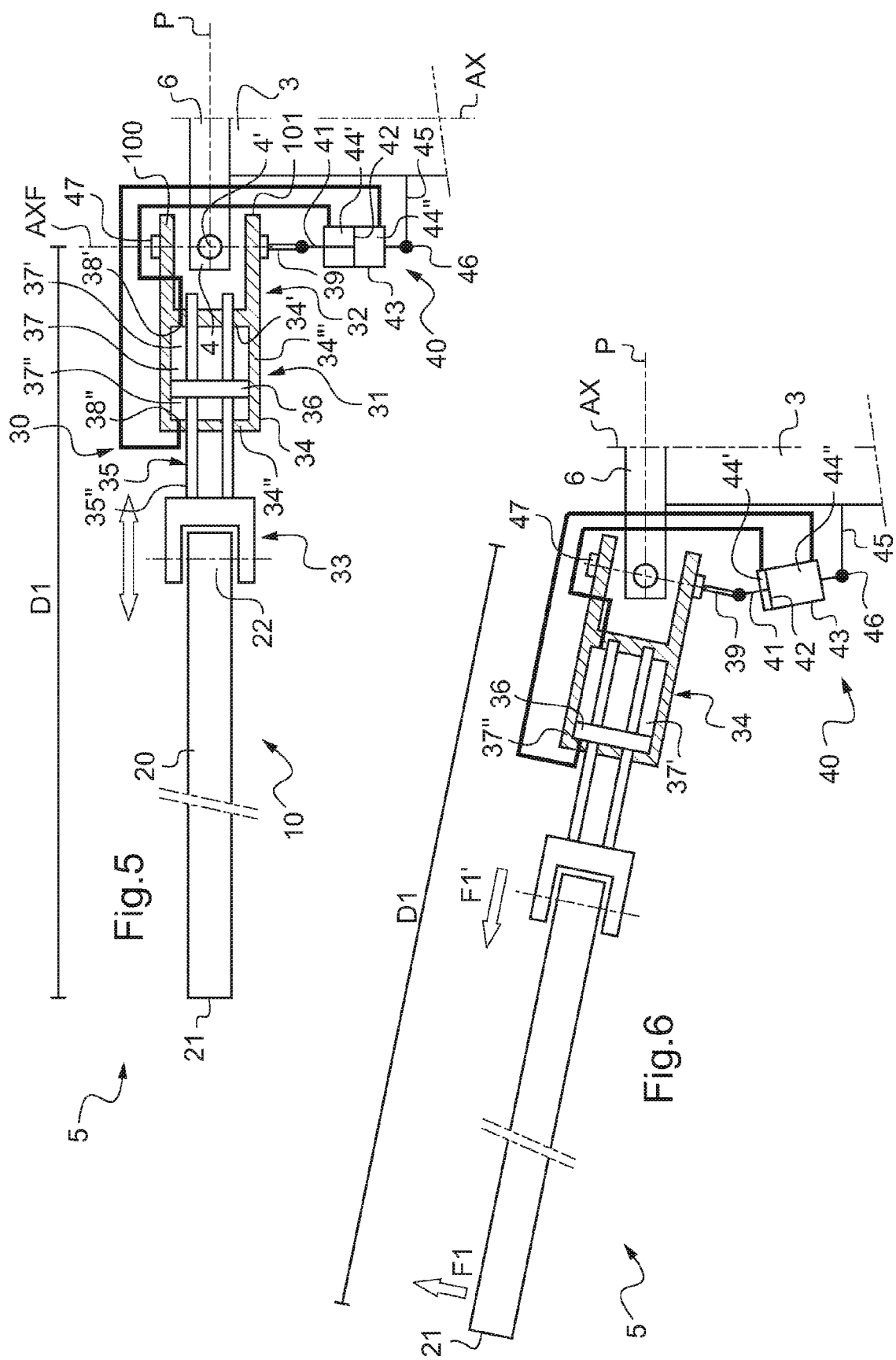

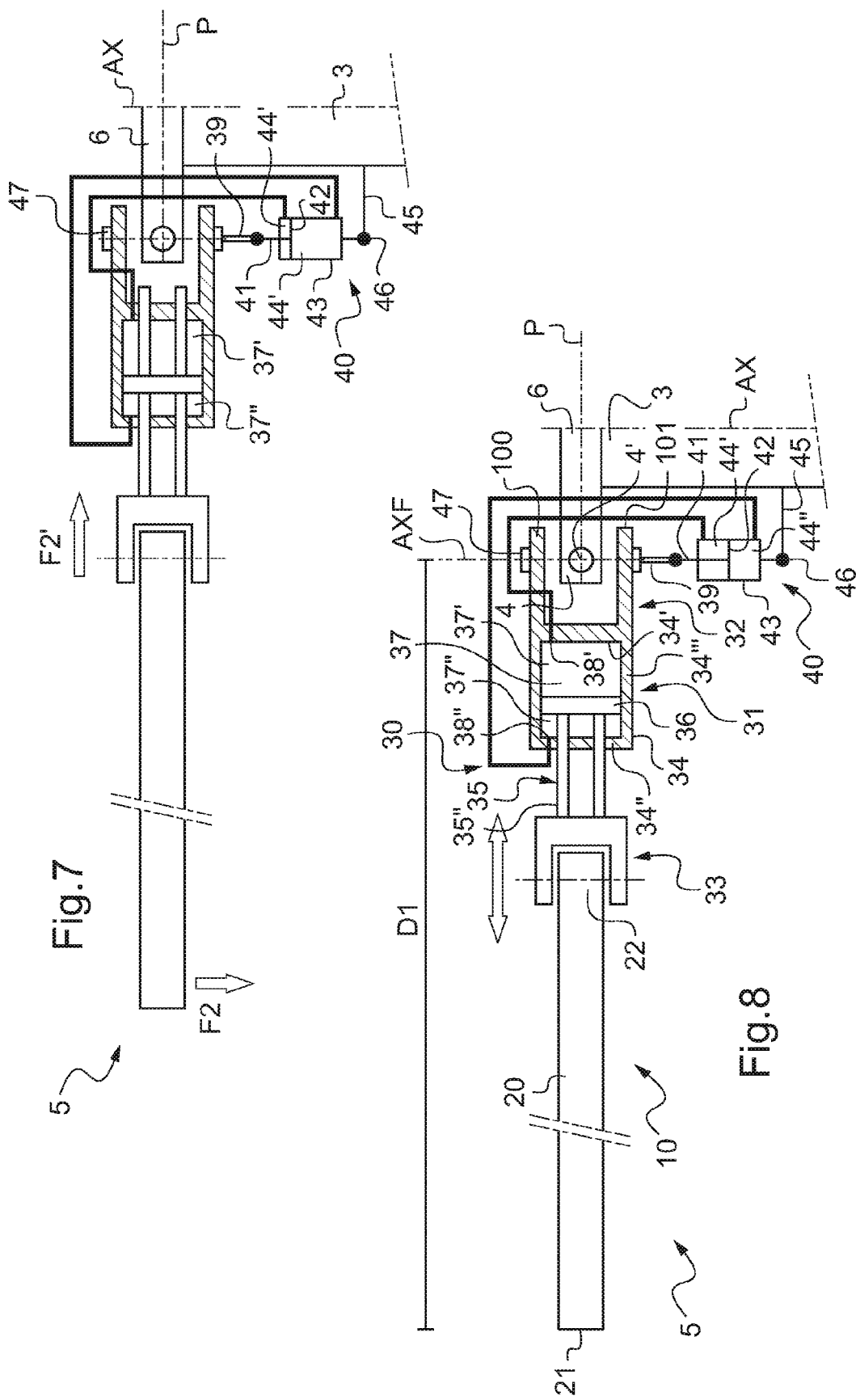

METHOD OF REDUCING OR EVEN ELIMINATING THE VIBRATION OF A ROTORCRAFT LIFT AND PROPULSION ROTOR, AND AN AIRFOIL ASSEMBLY AND A ROTOR IMPLEMENTING SAID METHOD

CROSS REFERENCE TO RELATED APPLICATION

This application claims the benefit of FR 09 03706 dated Jul. 28, 2009, the disclosure of which is incorporated herein by reference.

FIELD OF THE INVENTION

The present invention relates to a method of reducing, or even eliminating, the vibration of a rotorcraft lift and propulsion rotor, and it also relates to an airfoil assembly and to a rotor implementing said method.

The technical field of the invention is that of methods and means for attenuating rotor vibration as caused by the drag movements of a blade.

BACKGROUND OF THE INVENTION

In general, rotorcraft lift rotors comprise a hub driven in rotation about a drive axis by an outlet shaft of a main gearbox, referred to as a drive shaft, and at least two blades that are fastened to the hub via suitable hinges. For example, each blade has a sleeve that is hinged to the hub by means of a laminated elastomer thrust bearing.

It is recalled that assuming that each blade is embedded in a hub, the resulting rotor is a rigid rotor. While hovering, the distribution of aerodynamic forces along a blade gives rise to bending moments in flapping and in drag that present very large values at the root of the blade because of the way circumferential speed increases in proportion to the radius of the rotor.

Furthermore, in level flight, the so-called "advancing" blade exerts lift that is greater than the lift of the so-called "retreating" blade because of the difference in air speeds, as described below.

Consequently, the resultant of the aerodynamic forces exerted on a blade does not have the same value at all azimuth positions, nor does it have the same point of application: the bending moment at the root of the blade is thus high and variable, thereby generating alternating mechanical stresses that give rise to a fatigue phenomenon that is harmful to materials. Furthermore, the resultant of the aerodynamic forces on all of the blades is no longer carried by the drive axis of the rotor, thereby creating a roll moment, which increases with increasing speed of advance of the rotorcraft and which can make it difficult to balance the rotorcraft in level flight.

In order to remedy those drawbacks, it is known to hinge each blade to the hub about an axis that is perpendicular to the drive shaft and that is referred to as the vertical flapping axis, which axis corresponds to a vertical flapping hinge capable of transferring lift but under no circumstances of transferring a bending moment. Consequently, if a blade is hinged to the hub for flapping, the flapping bending moment is zero where it is attached, i.e. at the flapping hinge. To ensure a blade remains in equilibrium, centrifugal forces maintain the blade after it has flapped up a certain amount so that the resultant of the lift and of the centrifugal forces is oriented along said flapping axis, thereby causing conicity $a_0$ to appear.

Under such conditions, there is no longer any large roll moment in level flight and the blades no longer rotate in a plane, but rather their outer ends describe a cone that is very flat.

During hovering, the conicity of the lift rotor is unvarying around one revolution, which means that the center of gravity of each blade as seen from above describes a circle on each revolution.

However, in order to perform level flight, the cone described by the blades of the lift rotor needs to be tilted by causing the pitch of the blades to vary cyclically. This requires a pitch hinge having its axis substantially parallel to the span of the corresponding blade. This new degree of freedom enables the lift of a blade to be controlled by acting on a general pitch control and/or by causing the pitch to vary cyclically, thus enabling the plane of rotation of the blades to be controlled so as to describe a cone of geometrical axis that no longer coincides with the drive axis as represented by the rotor shaft.

In this context, documents GB 1 188 947 and GB 1 188 946 describe means for twisting a blade by longitudinally moving an element that is suitable for turning ribs of the blade, said twisting nevertheless not being cyclic. In contrast, document WO 02/12063 describes a device for cyclically varying the pitch of a blade.

As mentioned above, the geometrical axis of the cone described by the blades may depart from the drive axis. Under such conditions, and unlike when hovering, the end of each blade is at a distance from the rotor shaft that varies. The projection of the end of each blade onto a plane that is perpendicular to the drive axis then no longer describes a circle, but rather an ellipse on each revolution. Thus, the projection of the end of each blade needs to describe arcs of different lengths over equal periods of time, thereby generating large alternating inertial bending moments on the blades in their plane. In order to avoid such moments, that give rise to undesirable mechanical stresses, it is necessary to hinge each blade in drag. Such a drag hinge operates about a drag axis that is substantially parallel to the rotor axis and that is consequently substantially perpendicular to the drag forces. To enable such a blade to be driven from the drive shaft, it is naturally necessary for the drag hinge not to coincide with the rotor axis, which means that the drag axis needs to be offset, or to present eccentricity e. It should be observed that this hinge enables a blade to move angularly in drag about the drag hinge under the effect of inertial forces and aerodynamic forces.

It should be observed that the angular moment in drag of a blade about the drag hinge under the effect of inertial forces and aerodynamic forces constitutes a source of vibration and of noise.

Devices that are bulky, heavy, and expensive, based on dampers and referred to as "drag adapters" are thus used to reduce such vibration and noise.

The technological background includes the document JP 4 215 596 and the document by B. Popescu et al., "Several considerations regarding the variable blade length rotor", Journal of Aircraft, AIAA, Reston, Va., USA, Vol. 31, No. 4, Jul. 1, 1994, pp. 975-977.

SUMMARY OF THE INVENTION

An object of the present invention is to propose a method that enables the vibration generated by the blades of a lift and propulsion rotor to be reduced or even eliminated.

According to the invention, a method of reducing or even eliminating the vibration of a lift and propulsion rotor of a rotorcraft and in particular of a helicopter, the rotor having a plurality of airfoil assemblies that perform rotary movement around a drive axis of the rotor, each airfoil assembly comprising a blade extending longitudinally from a root suitable for being fastened to hinge means of a hub of the rotor to a free end, a first distance extending between the free end and the hinge means, is remarkable in that the first distance is caused to vary cyclically so that the projection of the center of gravity of a blade on a horizontal plane perpendicular to the drive axis and containing the hinge means describes a circle.

In other words, the path followed by the center of gravity of a blade in the plane perpendicular to the drive axis and containing the hinge means becomes a circle. This plane is referred to as the "horizontal" plane insofar as it is substantially horizontal when the rotorcraft is standing on the ground, with the drive axis being substantially vertical in this configuration.

Consequently, according to the invention, the first distance between the free end of a blade and the hinge means is caused to vary during the revolution of the blade in order to avoid creating vibration.

Unlike the state of the art, no attempt is made to damp the vibration, but rather to prevent it being formed. By going against the prejudice that tended towards believing it to be impossible to counter the observed effect, and that as a result it was necessary to be satisfied with attempting to attenuate it, the invention makes it possible to minimize or even eliminate the vibration of a lift and propulsion rotor.

Likewise, contrary to the teaching of documents US 2003/206802 and US 2006/237581, the first distance is not varied as a function of the stage of flight, but is caused to vary cyclically, with the first distance varying during each revolution.

Document US 2003/206802 relates to a convertible aircraft provided with a cable device for moving a movable outer segment of a blade relative to an inner segment of the same blade so that the blades present a first length in "airplane" mode and a second length in "helicopter" mode.

Likewise, document US 2006/237581 relates to an autogyro provided with means using cams to cause the length of the blades of a lift rotor to vary so as to reduce the lift provided by the lift rotor at high speed.

By forcing the center of gravity to describe a circle, instead of an ellipse, the generation of vibration and noise is avoided.

This method also possesses one or more of the following additional characteristics.

Thus, the radius of the circle described by the center of gravity of each blade is advantageously equal to 0.5 times the span of the blade between the root and the free end of the blade, the weight distribution of the blade in the span direction being substantially constant, except at the root of the blade, which is heavier but of limited span.

Furthermore, the first distance is optionally caused to vary in proportion with the absolute value of the flapping angle of the blade relative to the horizontal plane. Under such circumstances, said first distance is varied when the blade flaps. Each flapping movement of a blade gives rise to an adjustment of the first length.

For example, when the blade flaps so that its free end moves away from the horizontal plane of the rotorcraft, the absolute value of the flapping angle of the blade increases. Under such circumstances, the first distance is lengthened. The free end of the blade is thus moved away from the hinge means.

Conversely, when the blade flaps so that its free end moves towards the horizontal plane of the rotorcraft, the absolute value of the flapping angle of the blade decreases. The first distance is then shortened.

Ideally, the first distance between the free end of the blade and its hinge means is varied inversely with the cosine of the flapping angle, so that the free end of the blade remains at a constant first distance from the drive axis and thus from the mast of the rotor.

In addition to the method, the invention also provides an airfoil assembly performing rotary movement about a drive axis, the airfoil assembly being provided with a blade extending from a root towards a free end, the airfoil assembly including a sleeve secured to the root. The airfoil assembly is then remarkable in particular in that the sleeve is provided with a control actuator having first and second fastener means respectively for fastening to hinge means of a hub of a rotor and to the root, the control actuator causing a first distance between the free end and the hinge means to vary so that the projection of the center of gravity of a blade on a horizontal plane perpendicular to the drive axis containing the hinge means describes a circle.

Thus, the sleeve is lengthened or shortened respectively to lengthen or shorten said first distance.

The airfoil assembly also possesses one or more of the following additional characteristics.

In an electric variant, said control actuator is an electric control actuator controlled by a control member, the airfoil assembly being provided with an angle sensor suitable for providing the control member with a signal that is proportional to a flapping angle of the blade relative to a horizontal plane perpendicular to the drive axis and containing the hinge means.

In a hydraulic variant, the control actuator is a hydraulic control actuator.

Advantageously, the hydraulic control actuator comprises a hollow main cylinder provided with the first fastener means and with at least one movable rod passing at least in part through the cylinder, the rod connecting the second fastener means to a separator that slides in a volume of the cylinder so as to define first and second hydraulic control chambers, of volumes that are thus variable.

By increasing or reducing the volume of a control chamber, the control rod and thus the blade is moved via the second fastener means.

The rod extends from a first distal end to a second distal end.

In a preferred embodiment, the separator is secured to the rod between its first and second distal ends, and the second distal end is secured to the second fastener means for fastening the sleeve to the root of the blade.

The rod then passes right through the main cylinder, i.e. through the two walls at opposite ends of the inside volume of the cylinder.

This configuration is advantageous for supporting blades of considerable weight.

In an alternative embodiment, the first distal end is secured to the separator of the hydraulic control actuator, while the second distal end is secured to the second fastener means fastening the sleeve to the root of the blade.

The rod then passes through part of the main cylinder of the hydraulic control actuator, i.e. through only one of the walls of the main cylinder.

In addition, the main cylinder possesses first and second orifices suitable for connecting said first and second hydraulic control chambers respectively to a hydraulic circuit. A fluid, such as oil, can then enter or exit the first and second control chambers respectively via said first and second orifices.

In a first variant, the first and second control chambers are connected to the hydraulic control circuit of the rotorcraft.

In a second variant that is preferred, the airfoil assembly has a hydraulic drive actuator provided with a drive piston with a head that slides in a casing defining first and second drive chambers, the first and second hydraulic control chambers being hydraulically connected respectively to the first and second drive chambers so that an extension of the drive actuator causes the hydraulic control actuator to lengthen and a retraction of the drive actuator causes the hydraulic control actuator to shorten.

Thus, an additional drive actuator is used to modify the volumes of the first and second control chambers and thus to cause the first distance to lengthen or shorten.

In order to control the hydraulic control actuator cyclically as a function of the flapping of the blade, the drive piston is hinged to a fastener rod that is fastened to the first fastener means of the sleeve.

Consequently, when the blade flaps, the blade causes the sleeve to move. The fastener rod fastened to the first fastener means of the sleeve then exerts a force on the drive piston which moves in translation.

The volumes of the first and second drive chambers thus vary, thereby causing the volumes of the first and second control chambers to vary. The drive piston thus moves and modifies said first distance.

In order to optimize the connection between the fastener rod and the drive piston, the fastener rod is advantageously arranged along a fastener axis that is suitable for intersecting the hinge means.

More precisely, the fastener rod is advantageously fastened to the first fastener means of the sleeve via a ball bearing so that a modification to the pitch of the blade has no influence on the first distance.

In addition, the fastener axis is advantageously perpendicular to the flapping axis of the blade and to the pitch variation axis of the blade.

Finally, the invention also provides a rotor provided with a hub secured to a mast and provided with a plurality of hinge means, each hinge means being fastened to an airfoil assembly. The rotor is remarkable in particular in that it is provided with airfoil assemblies as described above.

Optionally, each airfoil assembly has a hydraulic control actuator having both first fastener means fastened to the hinge means and second fastener means fastened to the root of a blade, the airfoil assembly having a drive actuator that co-operates with the hydraulic control actuator, the drive actuator being fastened to a ball joint that is secured to the mast by a connecting rod.

BRIEF DESCRIPTION OF THE DRAWINGS

The invention and its advantages appear in greater detail from the following description of embodiments given by way of illustration and with reference to the accompanying figures, in which:

FIGS. 1 and 2 are diagrams explaining the state of the art;

FIGS. 3 and 4 are diagrams explaining the method of the invention;

FIGS. 5, 6, and 7 are sections showing a lift and propulsion rotor fitted with a hydraulic control actuator in a preferred embodiment;

FIG. 8 is a section showing a lift and propulsion rotor provided with a hydraulic control actuator in an alternative embodiment.

DETAILED DESCRIPTION OF THE PREFERRED EMBODIMENT

Figure 9:
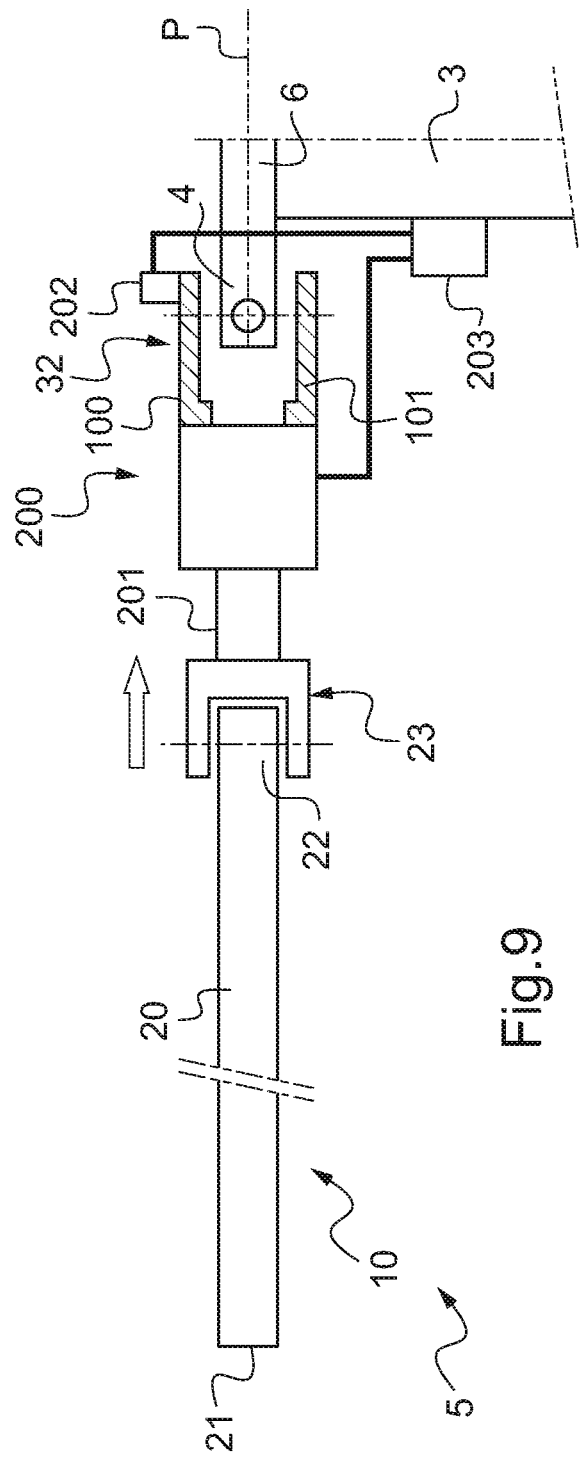
FIG. 9 is a section showing a lift and propulsion rotor provided with an electric control actuator.

Elements that are shown in a plurality of different figures are given the same references in each of them.

FIG. 1 shows a rotorcraft 1, and more precisely a helicopter of the prior art.

The rotorcraft 1 is provided with a fuselage 2 and a rotor 5 providing lift and propulsion to the rotorcraft 1.

Consequently, the rotor 5 is provided with a mast 3, conventionally referred to as the rotor mast, suitable for being rotated about a drive axis AX by a power plant (not shown).

The mast 3 is then secured to a hub 6 having a plurality of airfoil assemblies 10 fastened thereto. Under such circumstances, each airfoil assembly 10 comprises a blade 20 extending from a blade root 22 towards a free end 21, the blade root 22 being fastened to the hub 6 by hinge means 4, a laminated elastomer thrust bearing serving in particular to provide the functions of a flapping hinge, a drag hinge, and a pitch hinge, e.g. about a flapping axis, a drag axis, and a pitch axis.

It should be observed that FIG. 1 shows a blade 20 that can occupy two distinct positions POS1 and POS2 that are reached in succession. In examples that are not shown, a sleeve is interposed between the root 22 of a blade and the hinge means 6.

As it rotates, a blade 20 performs flapping movements. The angle α, referred to for convenience as the flapping angle α, that exists between the outer casing of the blade and a plane referred to for convenience as the horizontal plane P, varies during a single revolution, the horizontal plane P containing the hinge means 4 and being perpendicular to the drive axis AX of the rotor 5.

Thus, between first and second positions POS1 and POS2 the flapping angle α varies.

With reference to FIG. 2, a first distance D1 between the free end 21 of a blade from the corresponding hinge 4 is constant so the flapping of the blade leads to the projection TR of the center gravity Cg of a blade 20 onto the horizontal plane P describing an ellipse.

The consequence of such elliptical movement is to create an unbalance that results in vibration that the state of the art attempts to damp using adapters.

FIGS. 3 and 4 explain the method of the invention seeking to prevent the occurrence of such vibration caused by the elliptical path followed by the center of gravity Cg of a blade in said horizontal plane P so as to greatly reduce or even eliminate the vibration caused by the rotor 5. It should be observed that FIG. 3 presents a blade 20 capable of occupying two distinct positions POS1 and POS2.

Thus, with reference to FIG. 3, cyclical variation is imparted to the first distance D1 between the free end 21 of a blade 20 and the corresponding hinge means 4 of the airfoil assembly 10 connecting it to the hub 6 of the rotor 5, i.e. the distance between the free end and the hinge center of the blade. It should be observed that the term "hinge center" of a blade is used to designate the intersection between the flapping, pitch, and drag axes of the blade as defined by the laminated elastomer thrust bearing.

It is explained below that the airfoil assembly 10 is provided for this purpose with a sleeve 30 connecting a blade 20 to hinge means 4, e.g. a laminated elastomer thrust bearing. The sleeve 30 is then capable of lengthening or shortening so as to move the free end 21 of the blade radially relative to the rotor 5 or longitudinally relative to the blade 20 in question.

Advantageously, the first distance D1 varies in proportion to the absolute value of the flapping angle α of the blade 20.

Thus, the first distance D1 is longer when the airfoil assembly 10 is in the second position POS2 than when it is in the first position POS1.

When the blade 20 flaps on passing from the first position POS1 to the second position POS2, thereby causing its free end 21 to move away from the horizontal plane P, the first distance is lengthened. This results in the center of gravity Cg of the blade 20 moving radially relative to the rotor 5 or longitudinally relative to the blade 20, with the second distance D2 between the center of gravity Cg and the hinge means D2 then increasing.

Conversely, when the blade 20 flaps by going from the second position POS2 to the first position POS1 so as to bring its free end 21 closer to the horizontal plane P, then the first distance is shortened. As a result, the center of gravity Cg of the blade 20 is caused to move radially relative to the rotor 5 or longitudinally relative to the blade 20, with the second distance D2 between the center of gravity Cg and the hinge means D2 being shortened.

With reference to FIG. 4, by causing the first distance D1 to vary cyclically, the projection TR of the center of gravity of the blade 20 of an airfoil assembly 10 onto the horizontal plane P becomes a circle, where the horizontal plane P contains the hinge means 4 and extends perpendicularly to the drive axis AX of the rotor 5.

The radius R of this circle is advantageously equal to 0.5 times the span L0 of the blade between the root 22 and the free end 21 of said blade.

Thus, the first distance D1 between the free end 21 of the blade 20 and its hinge means 4 is caused to vary inversely with the cosine of the flapping angle α so that the free end 21 of the blade 20 remains at a constant first distance D1 from the drive axis AX and thus from the mast 3 of the rotor. More precisely, the first distance D1 is equal to the radius R divided by the cosine of the flapping angle α.

FIGS. 5, 6, and 7 show a rotor 5 provided with an airfoil assembly 10 having a hydraulic control actuator 31 of the invention.

The airfoil assembly 10 firstly comprises a blade 20 of span that extends from a root 22 towards a free end 21.

In addition, in order to fasten the blade 20 to hinge means 4 of the hub 6, the airfoil assembly 10 has a sleeve 30 provided with first and second fastener means 32 and 33. Under such circumstances, the first fastener means 32 are fastened to the hinge means 4 while the second fastener means 33 are fastened to the root 22 of the blade 20.

Advantageously, the sleeve 30 possesses a hydraulic control actuator 31 having a cylinder 34 including an internal volume 37. For example, the cylinder 34 presents a circularly cylindrical hollow with its volume 37 being defined by first and second bases 34' and 34" respectively facing the hinge means 4 and facing the blade 20, the first and second bases being connected together by a ring 34'''.

The first base 34' of the cylinder 34 is also fitted with two cheeks 100 and 101 forming the first fastener means 32, these two cheeks being suitable for co-operating with an outer strength member of a laminated elastomer thrust bearing of the hinge means 4.

Furthermore, the hydraulic control actuator 31 has a control piston secured to the second fastener means 33, the head of this control piston sliding inside the volume so as to define first and second hydraulic control chambers 37' and 37".

More precisely, the control piston of the hydraulic control actuator 31 has at least one rod 35, and in the variant shown two rods, so as to be capable of supporting the blade 20, with the second distal end(s) 35" of the rod(s) being secured to the second fastener means 33, the second fastener means having a fork for fastening to the root 22 of the blade 20.

With reference to FIG. 5, each rod 35 passes right through the cylinder 34, longitudinally relative to the blade 20 and to the sleeve or radially relative to the rotor 5. The first distal end 35' of each rod 35 co-operates with the first base 34' of the cylinder 34.

It can be understood that conventional sealing means are used to prevent leaks appearing at the interfaces between each rod 35 and the cylinder 34.

The head of the control piston is then represented by a separator 36, e.g. a circular plate, that is connected to the second fastener means 33 by the rods 35.

The separator 36 is secured to the rods 35 between their first and second distal ends by being arranged in the volume 37 of the cylinder 34 of the hydraulic control actuator 31. The separator 36 thus separates the volume 37 into first and second hydraulic control chambers 34' and 34".

This preferred embodiment enables the sleeve 30 to support blades having considerable weight.

Nevertheless, as an alternative, and with reference to FIG. 8, the first distal end 35' of each rod 35 may be secured to the separator 37. The rods 35 then pass through part of the cylinder 34 only, passing solely through the second base 34" of the cylinder 34 and not through its first base 34'.

In addition, the first and second chambers are connected to a hydraulic circuit via first and second orifices 38' and 38", e.g. formed respectively through the first and second bases 34' and 34" of the cylinder 34. By increasing the pressure in one or the other of the control chambers, the rods 35 of the control piston are caused to move, thereby lengthening or shortening the first distance D1 between the free end of the blade 20 and the hinge means 4.

The hydraulic circuit may be the hydraulic circuit of a rotorcraft and it may be controlled by a computer, for example.

Nevertheless, with reference to FIG. 5, the airfoil assembly is advantageously independent, and possesses a drive actuator 40 having a drive piston 41 with a drive head 42 that slides in an outer casing 43, such as an outer casing defining a hollow cylindrical housing, for example.

The drive head 42 then separates first and second drive chambers 44' and 44" that are respectively connected hydraulically to the first and second control chambers 34' and 34" by pipework.

Furthermore, the casing 43 of the drive actuator 40 is fastened to the mast 3 of the rotor 5. More precisely, the casing 43 is fastened to a ball joint 46 of a connecting rod 45, the connecting rod 45 being fastened to the mast 3.

In addition, the drive piston 41 of the drive actuator 40 is hinged to a fastener rod 39 via a ball joint, the fastener rod 39 being secured to a ball bearing 47 itself fastened to the cheeks 100 and 101 of the cylinder 34. The fastener rod 39 is also arranged along a fastener axis AXF intersecting the hinge means 4, and more particularly its hinge center 4', and advantageously perpendicular to the pitch variation axis and to the flapping axis of the blade 20.

It should be observed that the fastener rod 39 may be fastened directly to a cheek 101 if the influence of the pitch of the blade is negligible.

With reference to FIG. 6, when the blade 20 tends to move away from the horizontal plane P, the cylinder 34 pivots about the hinge means 4 in the clockwise direction F1.

Consequently, since the connecting rod 45 is stationary, the casing 43 of the drive actuator pivots about the ball joint 46 and the fastener rod 39 causes the drive actuator 40 to extend by pulling on the drive piston 41. The head of the drive piston expels the fluid contained in the first drive chamber 44' and injects it into the first control chamber 37' which fills up. Conversely, the fluid contained in the second control chamber 37" passes into the second drive chamber 44", which fills up.

Consequently, the separator 36 of the hydraulic control actuator moves and causes the rods 25 and the blade 20 to move along arrow F1'. The first distance D1 therefore increases. The extension of the drive actuator generates an extension of the hydraulic control actuator 31.

Thus, it is the flapping of the blade 20 that generates a modification to the first distance D1 so as to enable a circular path to be obtained for the center of gravity Cg of the blade as projected onto a horizontal plane P containing the hinge means 4 and extending perpendicularly to the drive axis AX.

With reference to FIG. 7, when the blade 20 tends to move towards the horizontal plane P, then the cylinder 34 pivots about the hinge means 4 in the counterclockwise direction F2.

Consequently, since the connecting rod 45 is stationary, the casing 43 of the drive actuator pivots about the ball joint 46 and the fastener rod 39 of the cylinder 34 causes the drive actuator 40 to retract by pushing the drive piston 41 into the casing 43. The head of the drive piston expels the fluid contained in the second drive chamber 44" and injects into the second control chamber 37" which fills up. Conversely, the fluid contained in the first control chamber 37" passes into the first drive chamber 44' which fills up.

As a result, the separator 36 of the hydraulic control actuator moves causing the rods 25 to move and thus causing the blade 20 to move along arrow F2'. This reduces the first distance D1. Retraction of the drive actuator 40 thus generates retraction of the hydraulic control actuator 31.

FIG. 9 shows an electric variant of the invention.

In this variant, the control actuator is an electric control actuator 200 provided with first fastener means 32 of the above-described type and having a movable member 201 that is connected to the second fastener means 33.

By way of example, the movable member 201 is a worm-screw that is driven by a motor that is not shown.

The electric control actuator 200 is controlled by a control member 203 arranged on the mast 3, for example. This control member 203 is also connected to an angle sensor 202 suitable for giving it information relating to the absolute value of the flapping angle α of the blade 20. Under such circumstances, and as a function of this information, the control member 203 can cause the movable member 201 to lengthen or to shorten.

Naturally, the present invention may be subjected to numerous variations as to its implementation. Although several embodiments are described, it can readily be understood that it is not conceivable to identify exhaustively all possible embodiments. It is naturally possible to envisage replacing any of the means described by equivalent means without going beyond the ambit of the present invention.

For example, although the figures show a helicopter having a single lift and propulsion rotor, it will be understood that the invention also applies to a helicopter having two rotors, i.e. possibly having two lift and propulsion rotors that are arranged in tandem.

What is claimed is:

1. A method of reducing the vibration of a lift and propulsion rotor of a rotorcraft, the rotor having a plurality of airfoil assemblies that perform rotary movement around a drive axis of the rotor, each airfoil assembly comprising a blade extending longitudinally from a root suitable for being fastened to hinge means of a hub of said rotor to a free end, a first distance extending between said free end and said hinge means, the method comprising:

varying said first distance cyclically so that the projection of the center of gravity of a blade on a horizontal plane perpendicular to said drive axis and containing said hinge means describes a circle.

2. A method according to claim 1, wherein the radius of this circle is equal to 0.5 times the span of the blade between said root and said free end.

3. A method according to claim 1, wherein varying said first distance comprises varying said first distance in proportion to the absolute value of the flapping angle (α) of the blade relative to said horizontal plane.

4. A method according to claim 1, wherein varying said first distance comprises varying the first distance inversely with the cosine of the flapping angle (α) so that the free end of the blade remains at a constant first distance from the drive axis.

5. A method according to claim 1, wherein varying said first distance comprises lengthening said first distance when the blade (20) flaps so that its free end moves away from the horizontal plane.

6. A method according to claim 1, wherein varying said first distance comprises shortening said first distance when the blade flaps to move its free end towards the horizontal plane.

7. An airfoil assembly for a propulsion rotor of an aircraft performing rotary movement about a drive axis, said airfoil assembly being provided with a blade extending from a root towards a free end, said airfoil assembly including a sleeve secured to said root, and wherein said sleeve is provided with a control actuator having first and second fastener means respectively for fastening to hinge means of a hub of a rotor and to said root, said control actuator configured to vary a first distance between said free end and said hinge means during normal flight operation so that the projection of the center of gravity of a blade on a horizontal plane perpendicular to said drive axis containing said hinge means describes a circle.

8. An airfoil assembly according to claim 7, wherein said control actuator is an electric control actuator controlled by a control member, said airfoil assembly being provided with an angle sensor suitable for providing the control member with a signal that is proportional to a flapping angle (α) of the blade relative to a horizontal plane perpendicular to said drive axis and containing said hinge means.

9. An airfoil assembly according to claim 7, wherein said control actuator is a hydraulic control actuator.

10. An airfoil assembly according to claim 9, wherein said hydraulic control actuator comprises a hollow main cylinder provided with said first fastener means and with at least one movable rod passing at least in part through said cylinder, the rod connecting said second fastener means to a separator that slides in a volume of said cylinder so as to define first and second hydraulic control chambers.

11. An airfoil assembly according to claim 10, wherein said cylinder possesses first and second orifices suitable for connecting said first and second hydraulic control chambers respectively to a hydraulic circuit.

12. An airfoil assembly according to claim 10, wherein said airfoil assembly has a hydraulic drive actuator provided with a drive piston with a head that slides in a casing defining first and second drive chambers, said first and second hydraulic control chambers being hydraulically connected respectively to said first and second drive chambers so that an extension of said drive actuator causes said hydraulic control actuator to lengthen and a refraction of said drive actuator causes said hydraulic control actuator to shorten.

13. An airfoil assembly according to claim 12, wherein said drive piston is hinged to a fastener rod fastened to the first fastener means of the sleeve.

14. An airfoil assembly according to claim 13, wherein said fastener rod is arranged along a fastener axis suitable for intersecting said hinge means.

15. A rotor provided with a hub secured to a mast and provided with a plurality of hinge means, each hinge means being fastened to an airfoil assembly, and wherein each airfoil assembly is in accordance with claim 7.

16. A rotor according to claim 15, wherein each airfoil assembly has a hydraulic control actuator having both first fastener means fastened to said hinge means and second fastener means fastened to the root of a blade, said airfoil assembly having a drive actuator that co-operates with said hydraulic control actuator, said drive actuator being fastened to a ball joint that is secured to said mast by a connecting rod.

17. A method of reducing the vibration of a lift and propulsion rotor of a rotorcraft, the rotor having a plurality of airfoil assemblies that rotate about a rotor drive axis, each airfoil assembly comprising a blade extending longitudinally from a blade root to a blade tip to define a blade length, the blade root being configured to couple to a hinge at a rotor hub, the blade having a center of gravity, the method comprising:
varying the blade length to maintain a distance between the rotor drive axis and a projection of the blade center of gravity on a horizontal plane perpendicular to the drive axis and passing through the hinge.

18. The method of claim 17, wherein varying the blade length comprises varying the blade length in proportion to the absolute value of a flapping angle ($\alpha$) of the blade relative to the horizontal plane.

19. The method of claim 17, wherein varying the blade length comprises increasing the blade length when the blade tip moves away from the horizontal plane and decreasing the blade length when the blade tip moves toward the horizontal plane.

20. The method of claim 17, wherein varying the blade length comprises increasing the blade length and decreasing the blade length within a revolution of the blade.

21. The method of claim 17, wherein the projection of the blade center of gravity on the horizontal plane describes a circle.

* * * * *